United States Patent [19]
Barnard

[11] Patent Number: 5,025,876
[45] Date of Patent: Jun. 25, 1991

[54] ROTATING DISC MULTI-SURFACE VEHICLE

[76] Inventor: George B. Barnard, 396 S. Longwood Ct., Newbury Park, Calif. 91320

[21] Appl. No.: 453,947
[22] Filed: Dec. 20, 1989
[51] Int. Cl.$^5$ .............................................. B62D 57/00
[52] U.S. Cl. ...................................... 180/7.1; 180/10
[58] Field of Search ................ 280/205, 206; 180/7.1, 180/10, 302, 274; 74/572; 192/48.9, 48.91, 85 C, 48.2

[56] References Cited

U.S. PATENT DOCUMENTS

| | | | |
|---|---|---|---|
| 2,603,301 | 7/1952 | Sipior | 180/7.1 |
| 3,861,488 | 1/1975 | Hamada | 180/274 |
| 3,960,230 | 6/1976 | Van Wuytswinkel | 180/9.62 |
| 4,237,990 | 12/1980 | La | 180/21 X |
| 4,478,304 | 10/1984 | Delano | 180/302 X |
| 4,501,434 | 2/1985 | Dupuis | 180/10 X |

FOREIGN PATENT DOCUMENTS 2173560 10/1986 United Kingdom ................ 180/274

*Primary Examiner*—Charles A. Marmor
*Assistant Examiner*—Victor E. Johnson
*Attorney, Agent, or Firm*—Albert O. Cota

[57] ABSTRACT

A rotating disc propelled omni-directional vehicle operable on multi-surfaces which has a disc (20) in an eliptical or dish-shape in contact with the surface upon which it rests. A platform (26) is rotatably mounted on the disc and is capable of supporting human weight, such as a driver or a static cargo payload. A power source (40) is located on the platform and supplies mechanical energy to drive the disc. This energy is transmitted by a transmission to a flywheel (58), or flywheels (62), which either directly engage the disc or are separated by clutches (64) and (66). In an embodiment utilizing two flywheels, the torque developed by the power source is transmitted to one of the flywheels then disconnected and transferred to the disc. The other flywheel is brought up to speed and the pair are sequentially cycled allowing the flywheel to drive the disc without direct connection with the power source. Control and steering is accomplished by a combination of rotational speed and angular disposition of the platform created by a weight shift on the platform in combination with the use of a brake (60). Various power sources may be utilized and methods of actuating the clutches to transfer torque from one flywheel to the other.

22 Claims, 7 Drawing Sheets

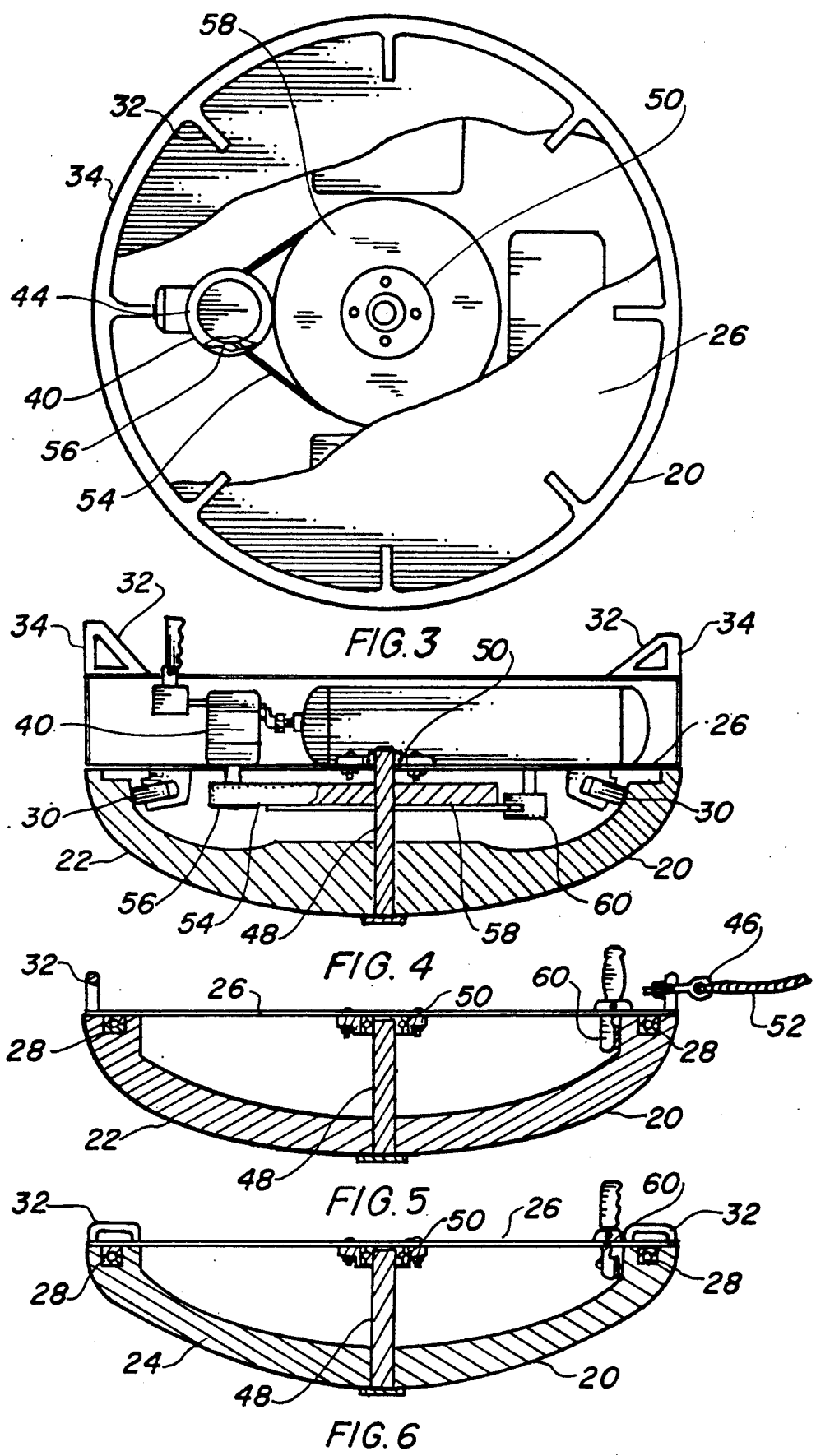

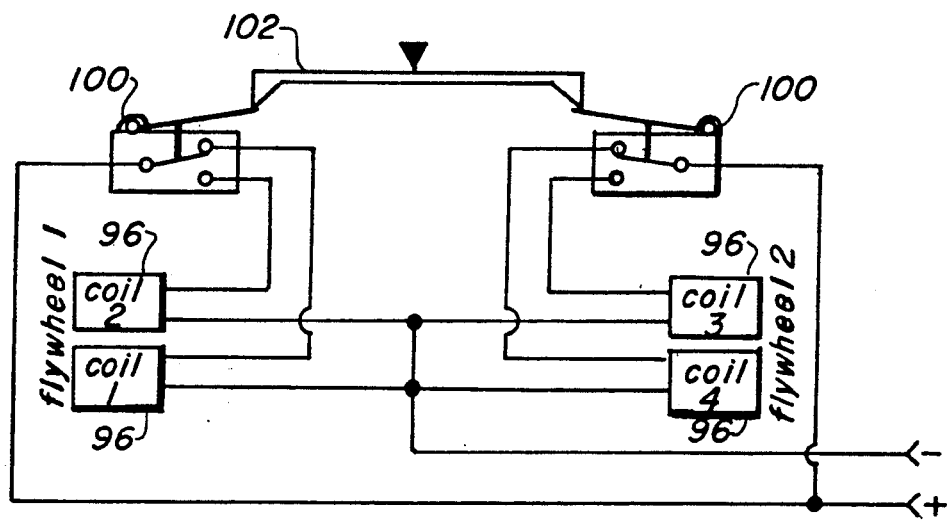
FIG. 13
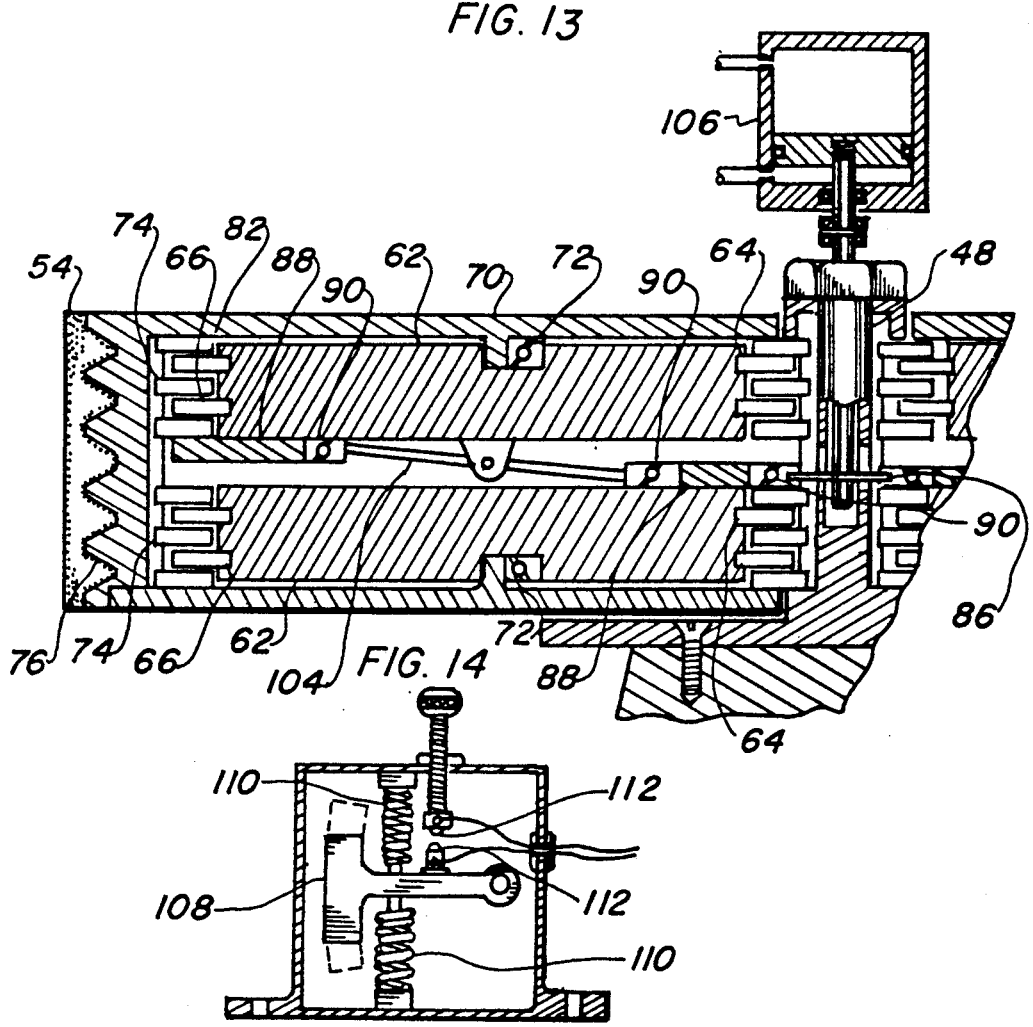
FIG. 14
FIG. 15

ROTATING DISC MULTI-SURFACE VEHICLE

TECHNICAL FIELD

The present invention relates to vehicles that traverse various ground or water surfaces in general. More particularly to a vehicle that employs a disk shaped rotating disc that propels itself by spinning on the surface with a shift in the center of gravity causing propulsion in the direction of the concentration of weight.

BACKGROUND ART

Vehicles have been driven by many types of wheels, the basic "round" wheel has been known almost since the beginning of civilization. Variations of multiple wheels have been utilized in an endeavor to provide propulsion including rollers or annular shaped wheels in pairs or multiples. From the prior art discovered, the use of a disc that revolves thereby providing the propulsion means for moving a platform has been lacking.

A search of the prior art did not disclose any patents that read directly on the claims of the instant invention however, the following U.S. patents were considered related:

| PATENT NO. | INVENTOR | ISSUED | | |
|---|---|---|---|---|
| 4,733,737 | Falamak | 29 | March | 1988 |
| 4,519,466 | Shiraishi | 28 | May | 1985 |
| 4,237,990 | La | 9 | December | 1980 |
| 3,700,058 | Kuwahara | 24 | October | 1972 |

Falamak teaches a drivable, steerable platform containing a number of wheel assemblies that are drivingly rotated and steered. The wheels are powered by a motor for unilateral steering and a separate motor with connecting shafts and gear trains drives the wheels to coordinate the steering and propulsion direction. The device may be turned 360° thereby steering the platform. The preferred embodiment is housed in a hollow sphere allowing the platform to move about on radically uneven terrain or even climb steps up to a height equal to approximate one-half of the spheres diameter.

Shiraishi employs a pair of inclined annular or doughnut-shaped wheels having a partially spherical surface of rubber or other elastic material arranged at an angle relative to the surface on which the drive system operates. The wheels are both driven in rotation by motors or the like and a similar motor changes the tilt angle which causes an omnidirectional movement of the system. A follower unit is arranged to follow the movement of the wheels and allows support for the system and may be in the embodiment of a caster or the like. The driven body is supported either jointly by the drive wheels and followers or solely by the followers (casters). The purpose of the system is to provide omnidirectional 360° movement simulating the ambulatory movement of a human being.

La utilizes three wheels disposed at the corners of a triangle with one of the wheels having an axis which is at an angle to the others such that the axis is parallel to the surface engaged by the rollers. No two-wheels are aligned or parallel to each other. Each wheel consists of a plurality of rollers rotating on their respective axis. The vehicle is therefore omnidirectional as every given set of wheel rotational speeds and directions produces only one possible vehicle motion with no conflict between wheels. The wheels are rotated by an electric motor or the like attached individually to each wheel. There is some bouncing as the wheels rotate from one roller to the other, however, the greater number of rollers, the less the bounce.

Kuwahara again uses a combination of three wheels on the periphery, however, a steerable drive wheel is located in the center. The three wheels are the caster type and swivel freely while the driving wheel extends below an imaginery plane of the casters, allowing the drive wheel to change direction of movement in response to changes in the manner in which the weight of the person riding on the car is distributed. A steering wheel is provided to change the direction of the drive wheel and a motor with a battery provides the rotational force to propel the vehicle. A grip wheel directly below the steering wheel provides a surface for riders to support themselves. It is indeed apparent that large surface rotating disks have not been employed in vehicles for propulsion even though the principle of shifting weight is known to control steering.

DISCLOSURE OF THE INVENTION

Basically wheels in one type or another have been the means to transport an object for centuries. Countless types, styles and shapes have been used ranging from a single wheel such as a unicycle to multiple pneumatic tires on large over the road vehicles and earth moving equipment. Rollers, caterpillar trucks, treads and a myriad of other combinations have been developed in all, using the same basic principle of a rotating annular ring with a weight bearing axle in the center.

As it has been mentioned, the known prior art while attempting to alter the precept has not been at all successful as invariably, the basic wheel emerges in a variation of configuration only. A unique form of propulsion has finally been developed that employs a new and novel method which can be related to a rotating or spinning object such as a flat stone skipping on the surface of water. Instead of using a basic wheel, a disc in convex shape is rotated externally, spinning on the surface with a stationary platform disposed directly above upon which people or a payload is positioned. The inherent problem with this concept that has heretofore not been addressed, is the tendency for the platform to spin the rider instead of the disc spinning on the contiguous surface particularly when starting from a motionless position.

It has been found that by rotating the disc without contact with the surface then disengaging the rotational power and shifting weight to engage the surface, the disc continues to spin by itself obtaining unexpected results by actually propelling, the device in the direction of the weight unbalance.

Steering is further achieved by a weight balance shift allowing unidirectional propulsion. Further propulsion may be continued by balancing the torque supplied by a motor or engine to a flywheel coupled to the disc using a brake rigidly attached to the platform. It has also been found that two or more flywheels may be utilized using the stored kinetic energy of one rotating the disc while the other is being accelerated to a given speed with the motor or engine then shifting alternately from one to the other.

With this new principle, a primary object of the invention allows the apparatus to travel over any relatively smooth surface such as sand, mud, swamp, marsh, hard or soft soil, vegetation, ice, snow, water etc. Since the footprints of the vehicle is very large relative to its weight, the major resistance is only with the friction of the disc to the surface which obviously varies as to its density and cohesiveness. The invention therefore is extremely versatile and may be truly designated as an all terrain vehicle.

An important object of the invention allows a multitude of prime movers to be employed. Almost any internal combustion engine will function ideally while electric motors with external connecting will function well in a limited environment or batteries extend the range so as not being dependent upon a fixed electrical power source. Any form of rotational power may be utilized from manpower to compressed fluid such as air or even jet powered combustibles.

Another object of the invention furthers the utility by taking advantage of an external source of power such as a tow vehicle. As an example, on snow a continuous belt powered vehicle may tow the device or on water, a propeller driven boat may also provide the propulsion. In this configuration, the disc and platform are greatly simplified as only the rotating capabilities between the two are required and perhaps a brake for safety reasons.

Still another object of the invention further simplifies the device by using gravity alone to provide the propulsion. This utility is most advantageously employed on snow or sand where hills are available and the vehicle in its basic form may be ridden downhill much like a toboggen or the like, except it may be easily steered in the appropriate direction.

Yet another object of the invention provides a safety control system that will stop the disc from spinning in the event that the disc strikes a solid object. Normally, stopping is accomplished by shifting weight to allow the disc to slide to a stop by friction or allowing the disc to spin in a direction opposite to the direction of travel. The safety control may be adjustable to prevent unwanted impedment of travel or so called nuisance trips and yet function when needed.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a plan view of the preferred embodiment with an electric motor and storage batteries as the power source.

FIG. 4 is a cross-sectional view taken along the center line of the preferred embodiment with an air motor and pneumatic storage tank as the power source.

FIG. 5 is a cross-sectional view taken along the centerline of the embodiment utilizing an external towing force.

FIG. 6 is a cross-sectional view taken along the centerline of the embodiment employing gravity as the motivational power source.

FIG. 13 is an electrical schematic of the electromechanical solenoid interconnection with the actuator switch.

FIG. 14 is a cross-sectional view taken along lines 14—14 of FIG. 10 depicting the hydraulic or pneumatic system for clutch actuation with a cylinder and mechanical linkage.

FIG. 15 is a pictorial diagram of the safety control mechanism.

BEST MODE FOR CARRYING OUT THE INVENTION

The best mode for carrying out the invention is presented in terms of a preferred embodiment with a number of variations in the generic configuration.

Figure 1:
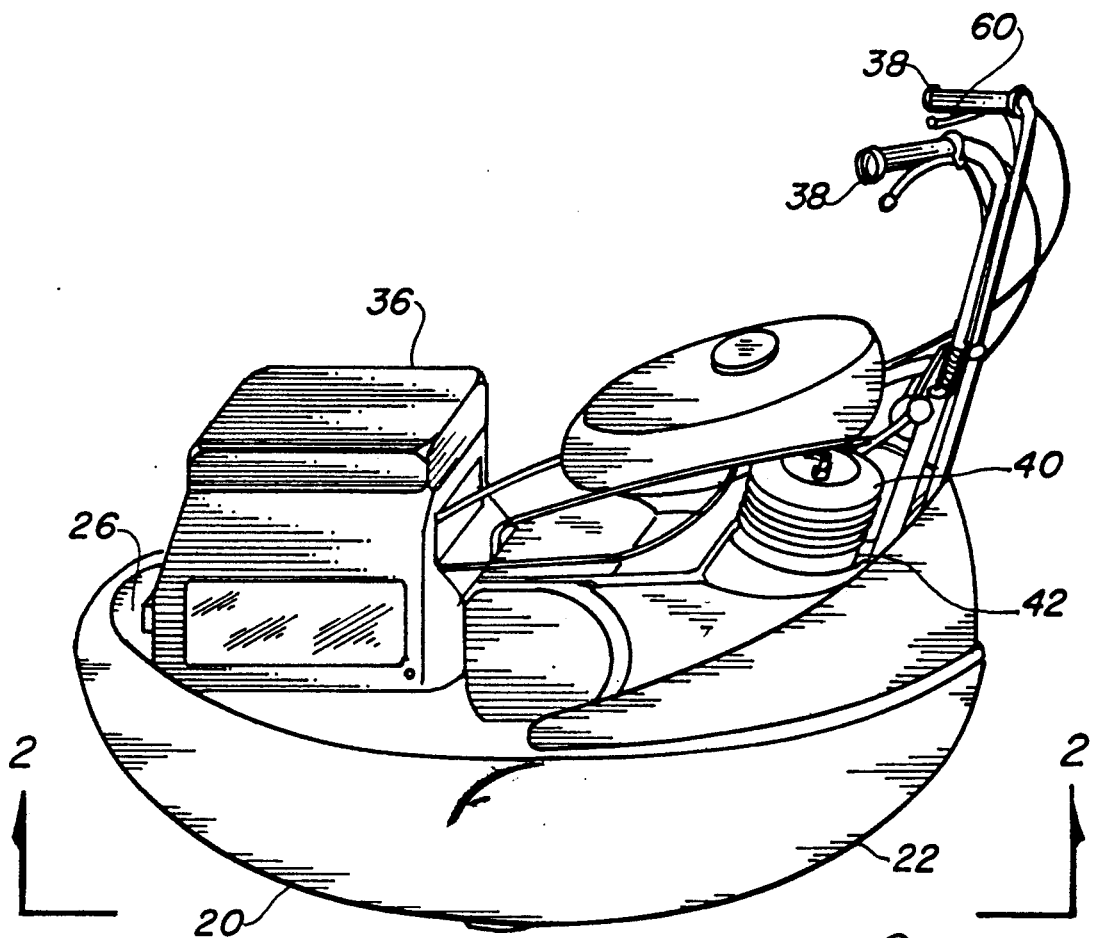
FIG. 1 is a partial isometric view of the preferred embodiment utilizing an internal combustion engine as the power source.
Figure 2:
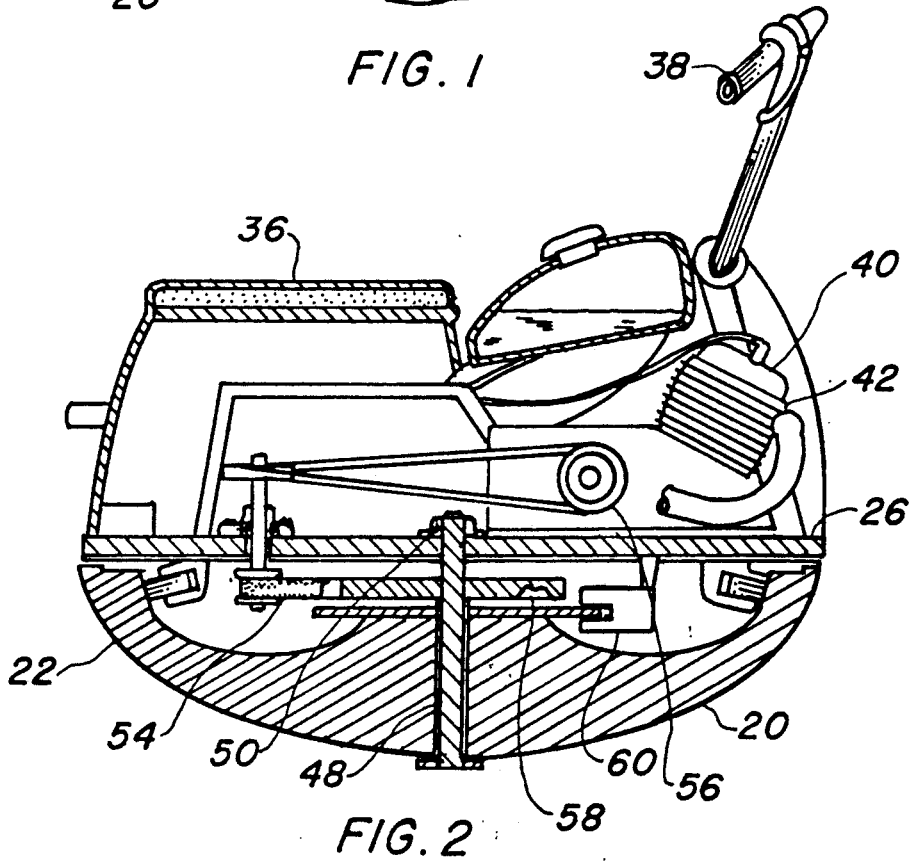
FIG. 2 is a cross-sectional view taken along lines 2—2 of FIG. 1 illustrating an engine power source and a single flywheel transmission.

FIGS. 1 and 2 illustrate the complete unit with the rotatable convex shaped disc 20 located on the entire bottom of the vehicle in contact with the surface on which it rests. The disc 20 may have an eliptical contour 22, as shown in FIGS. 4 and 5, or may be dish shaped 24, as illustrated in FIG. 6. The disc 20 may be fabricated of any material suitable for the purpose, such as metal, fiberglass covered wood, composites, with vacuum formed thermoplastic preferred. The outside surface is smooth and not easily worn by spinning on the surface of the ground, water or ice, or the like.

A platform 26 is rotatably mounted on top of the disc 20 with bearings 28 or rollers 30, depicted in FIGS. 2 and 6 respectively. The platform 26 is capable of supporting weight, such as humans, or a payload of goods, or it may also contain handles 32, or a guard rail 34, or even a seat 36 and handlebars 38, as depicted in FIGS. 1 and 2. The platform 26 again may be made of any suitable material such as metal, plywood, fiberglass with plastic being preferred.

A power source 40 is mounted on the platform 26 in any of a myriad of locations and physical positions. FIGS. 1 through 4 illustrate only a few possibilities and the power source 40 may be any type of drive from an internal combustion engine, as shown in FIGS. 1 and 2, to an electric motor 44 or a pneumatic system depicted in FIGS. 3 and 4, including means to store compressed air. These illustrations depict but a few variations of an acceptable power source 40, as any type of mechanical energy may be used equally well. It has also been found that an external towing source 46, such as an internal combustion engine vehicle including an automobile, truck, motorcycle, etc., or even a boat or so-called "JET-SKI", is able to propel the rotating disc vehicle with ease. With this type of propulsion, the disc 20 is rotated exactly in the same manner, except it is not self-propelled, however, the same principle of the rotating disc applies and steering is accomplished in the same manner with FIG. 6 illustrating such an embodiment. Even gravity may be used, as shown in the configuration of FIG. 6, where the same basic disc 20, and platform 26 are employed, except the power source 40 is external to the vehicle itself. When using gravity, the vehicle must be placed on an incline or hill where the natural forces may effect the vehicle in such magnitude as to rotate the disc as it slides down the hill. Gentle slopes or gradual inclines are not sufficient to operate the invention by this principle, as steering is accomplished in conjunction with the rotation of the disc 20, as explained later. In this embodiment, as shown in FIG. 6, a shaft 48 with a shaft bearing 50 is attached to the platform 26 and is utilized along with the bearing 28 on the periphery of the disc 20 separating the disc 20 from the platform 26. This configuration allows minimal frictional resistance such that the force of gravity will spin the disc 20 freely when subjected to gravitational forces. Another purpose for this shaft 48 in the self-contained drive is to allow the disc to spin prior to propulsion while balancing on the bottom of the shaft 48 and will be discussed in the functional explanation later. It will be noted that the center shaft 48 could be eliminated and the bearings 28 on the edge of the disc 20 may be utilized without changing the scope of the invention.

Transmission means transferring mechanical energy, basically in the form of torque, from the power source 40 to the disc 20 enables the disc to spin relative to the platform 26. In the towable embodiment of FIG. 5, this transmission means is simplified into an elementary flexible line 52 in the form of a rope or chain that allows motivation with the disc 20 rotating due to the frictional resistance of the surface on which it is being pulled. The embodiment of FIGS. 1 through 4 is somewhat more complex utilizing one or more belts 54 connected to the power source producing a rotational force employing a drive sheave 56, or the like. A single flywheel 58 is driven by one of the belts 54 and is connected mechanically to the disc 20. The flywheel 58 may also be described as a driven sheave or balance wheel which obtains its rotational energy directly from the power source through the belts 54. The weight of the flywheel creates a moment of inertia when rotated that follows dynamic laws of motion having the tendency to remain in motion equalizing the energy exerted and the work accomplished thereby preventing excessive or sudden changes in speed. In this specific environment, a mechanical brake 60 is used that slows down the rotation of the disc relative to the platform 26 allowing the platform 26 to remain stable and not turn when the disc 20 is continuing to turn from the energy of the power source. The brake 60 may be of any type, such as a caliper type, as illustrated in FIGS. 2 and 4, or a drum type depicted in FIGS. 5 and 6.

Figure 7:
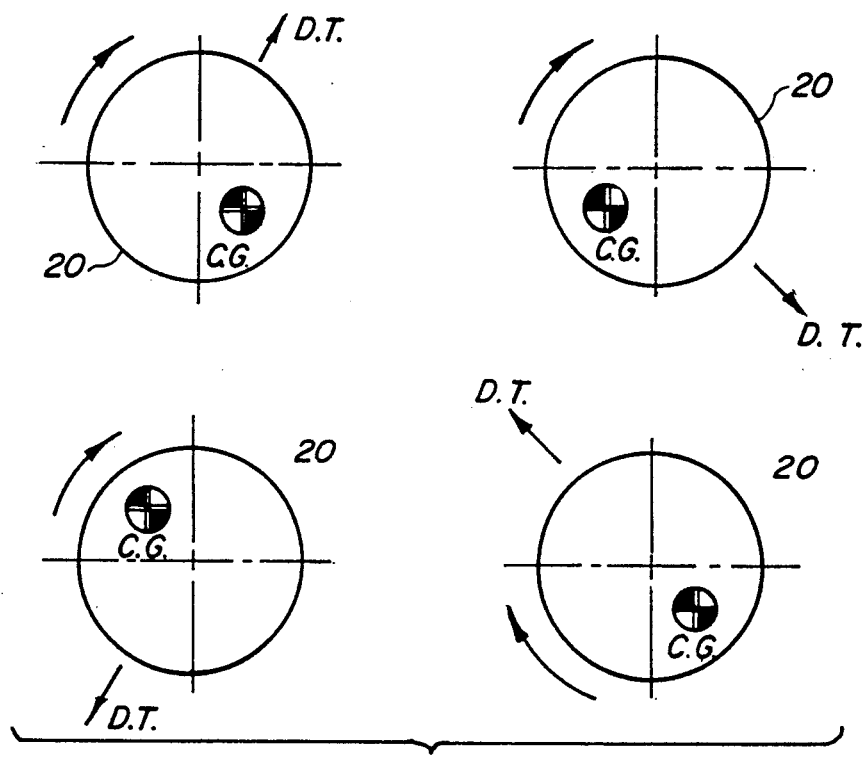
FIG. 7 is a schematic diagram of the direction of travel relative to the rotation and weight distribution. The rotation is illustrated with an arrow and the direction of travel is marked D.T. plus an arrow. The center of gravity is designated C.G. and is depicted within the radial envelope of the vehicle.

The control means in the embodiment using the single flywheel 58 comprises a weight strategically positioned on the platform creating an off-center balance condition influencing the disc 20 to be propelled in a given direction when spinning on the surface. The brake 60, in combination with the weight location, creates the omnidirectional control of the vehicle. The weight may be a payload of sorts or may be the human riding on, or driving the vehicle. FIG. 7 depicts the effect that the weight has in the actual direction the vehicle will be propelled when spinning on the surface. A radiused arrow in the upper left hand corner depicts the rotational direction and is unlabelled. A circle with a cross and an opposed filled in quadrants denotes the center of gravity and is designated C.G. The direction of travel or D.T. is illustrated with an arrow and the appropriate description. The combination of weight shifting and brake usage actually stabilizes the vehicle and maintains its steering in the desired operational direction.

Figures 8, 9:
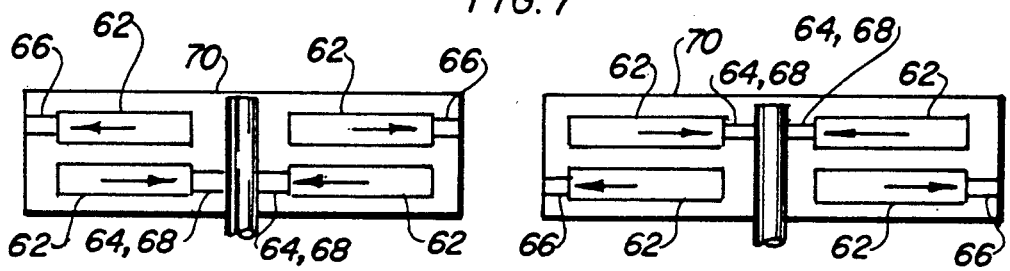
FIG. 8 is a diagram illustrating the physical connection of the flywheels to the shaft and housing with the line of drive through the first flywheel.
FIG. 9 is a diagram illustrating the physical connection of the flywheels to the shaft and housing with the line of drive through the second flywheel.

Another variation of the invention is pictorially illustrated in FIGS. 8 through 14 and incorporates a pair of flywheels 62, each having clutches on both the inside and outside diameters. The inside clutch is designated the inner clutch means 64 and the opposite is named the outer clutch means 66. The shaft 48, previously described, except shortened, is attached to the disc 20 and contains mating clutch means 68 that interface with the inner clutch means 64 allowing the flywheels 62 to be directly connected to the shaft 48. A flywheel housing 70 encompasses both flywheels 62 and independently supports each flywheel with a bearing 72 allowing each to freely rotate within the housing. A housing mating clutch means 74 is positioned inside the housing 70 in alignment with each flywheel outer clutch 68 allowing communication between one of the flywheels 62 and the housing 70. The outside perimeter of the housing 70 contains grooves 76 for one of the belts 54 that is driven by the power source 40 through a jackshaft 78 and mating sheaves 80. It will be noted that in the configuration of FIGS. 1, 2 and 10, a pair of belts 54 are required, however, the embodiment of FIGS. 3 and 4 require only a single belt 54. In any event, the flywheel housing 70 is externally rotated and one of the flywheels 62 is engaged mechanically to the shaft 48 and drives the disc 20 where the other is engaged to the power source 40 allowing it to build up synchronous speed with the prime mover. The engagement is accomplished through the use of the clutches 64, 66 and mating clutch means 68 and 74 alternately. This arrangement allows the energy of the power source to be transmitted to the disc indirectly without immediate contact by energizing the outer clutch 66 on one of the flywheels 62 then when up to speed disengaging the outer clutch 66 and then engaging the inner clutch 64 transmitting the kinetic energy stored up in the flywheel 62 to the disc 20. As soon as the power is consumed the clutches 64 and 66 reverse and the other flywheel 62 is utilized. By sequential operation almost constant torque is available for rotating the disc and the platform 26 is not rotated as it is independent of the torsional forces rotating the disc 20. FIGS. 8 and 9 pictorially illustrate this operational procedure as FIG. 8 shows the top flywheel 62 in contact with the flywheel housing 70 and the bottom flywheel 62 in contact with the shaft 48, and hence the disc 20. Directional arrows further clarify this relationship. FIG. 9 shows the opposite contact with the clutches reversed.

Figure 10:
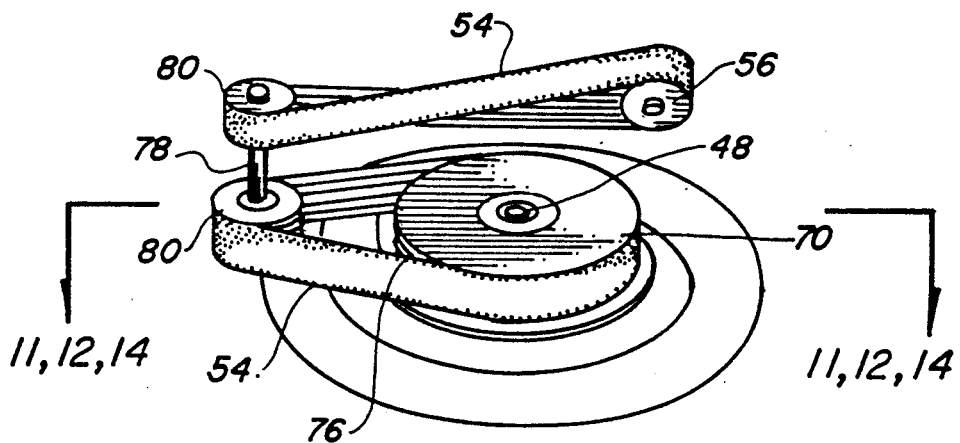
FIG. 10 is a partial isometric view of the transmission means in the pair of flywheels embodiment completely removed from the vehicle for clarity.
Figure 11:
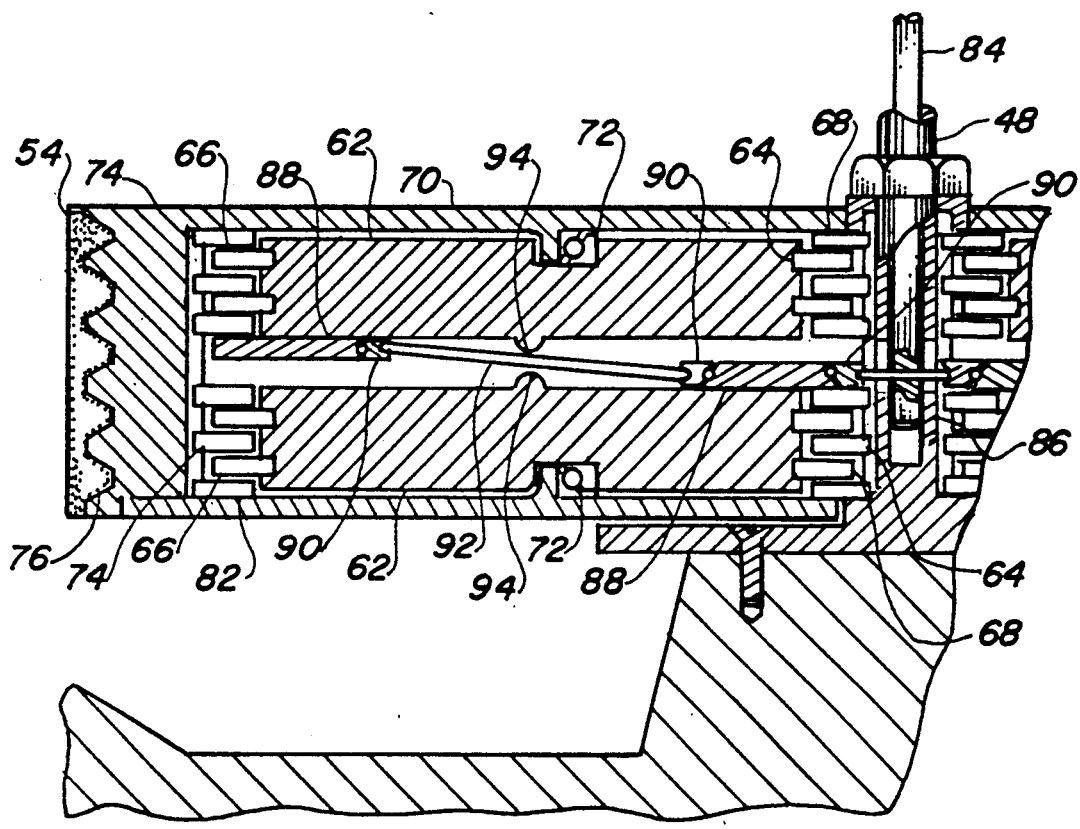
FIG. 11 is a cross-sectional view taken along lines 11—11 of FIG. 10 depicting the mechanical linkage clutch actuator.

There are a number of different methods of energizing the clutches in sequence, all of which accomplish the same purpose, that of utilizing the stored inertia from one flywheel while rotating the other with the power source and then switching over in a reversed procedure. FIG. 10 illustrates the overall relationship of the drive transmission and FIG. 11 depicts a specific mechanical linkage. This mechanical linked embodiment utilizes a plurality of friction discs 82, each set intermittently splined to the housing 70 and the flywheel 62 respectively forming the outer clutch means 66. Conversely another set of discs 82 are intermittently splined to the shaft 48 and flywheel 62 forming the inner clutch means 64. The flywheels 62, shaft 48 and housing 70 are matingly splined with the friction discs 82 allowing free rotation of the flywheel until the disc pack is pressed together, at which time the friction of the extended surface of each disc 82 is increased until complete unity is formed and the slipping therebetween stops and a solid mass is formed. A control rod 84 is positioned inside a bore in the shaft 48 with a pin 86 extending through slots therein. A pair of actuating rings 88 are positioned between the flywheels 62 and are in alignment with both the inner and outer clutch means 64 and 66. These rings 88 have isolating bearings 90 that allow the portion adjacent with the shaft 48 and facing each other to be rotatably isolated. The innermost portion of the inside ring 88 is connected to the pin 86 extending from the slots in the shaft 48 and the rings 88 are connected together on the inside by a wave spring 92. A pivot 94 for the spring 92 is formed into the flywheels 62 at mid point between the rings 88 and acts as a pivot point for the spring 92.

When the control rod 84 is actuated, by pulling or pushing in a linear direction, the pin pulls or pushes the inner ring 88, thereby moving the ring 88 into contact with the friction discs 82, either on the top or bottom, according to the direction of movement. This motion energizes the appropriate clutch 64 while simultaneously the spring 92 flips the outer ring 88 into the opposite position energizing the opposed outer clutch 66. FIG. 11 illustrates the connection of the bottom flywheel 62 to the shaft and the top flywheel 62 to the housing 70, the same as illustrated in FIG. 8. While this mechanical linkage is shown and described, any other style may be used equally well, therefore, the invention is not limited to this embodiment only.

Figure 12:
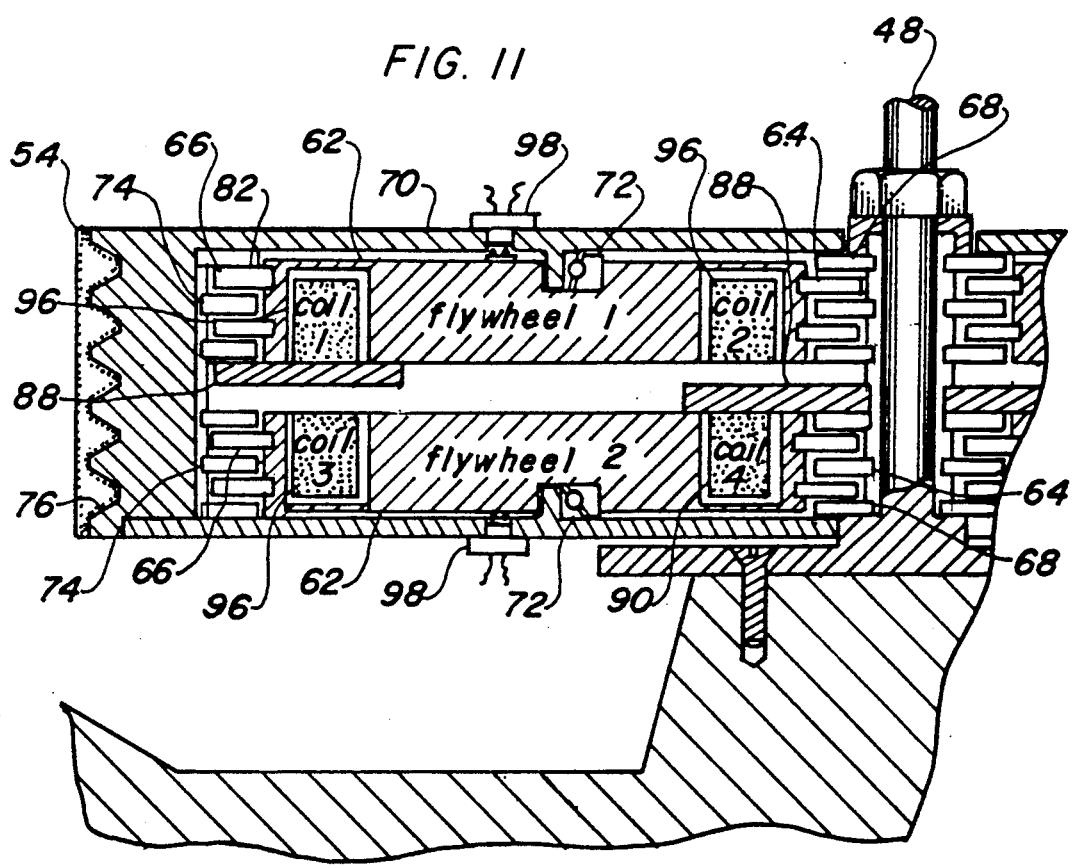
FIG. 12 is a cross-sectional view taken along lines 12—12 of FIG. 10 depicting the electromechanical solenoid clutch actuator.

FIGS. 12 and 13 illustrate another embodiment of the clutch means actuated by electromagnetic solenoid means. The difference in this method and that described above is that the rings 88 are not equipped with isolating bearings and are pulled into place by electromagnetic force. This magnetic force energizes the clutch 64 and 66 by compressing the rings 88 tightly against the disc stack 82 with the force created by an electromagnetic holding coil 96 embedded into each flywheel. This coil is well known in the art and consists of an electrical conducting wire wound into a ring with a magnetic force being developed when electrical current is passed therethrough. The current is obtained through conventional conductors using a slip-ring 98 on the flywheel 62 and housing 70 allowing the current to pass through when the elements are rotating independently. FIG. 13 depicts a typical schematic of the electrical circuit using a power source of direct current. The single pole double throw switches 100 are controlled by a double pole momentary switch 102 which is actuated by the operator.

FIG. 14 depicts yet another clutch actuating means using hydraulic or pneumatic pressure. The drawing illustrates but one embodiment, however, either pressure source may be used for actuation. The elements are basically the same as shown in FIG. 11, except the wave spring 92 is replaced by a mechanical link 104 pivoted on the upper flywheel 62. The clutch is actuated by a hydraulic or pneumatic cylinder 106 connected to the control rod 84 providing the linear force to move the actuating rings 88 into their functional position.

Figure 17:
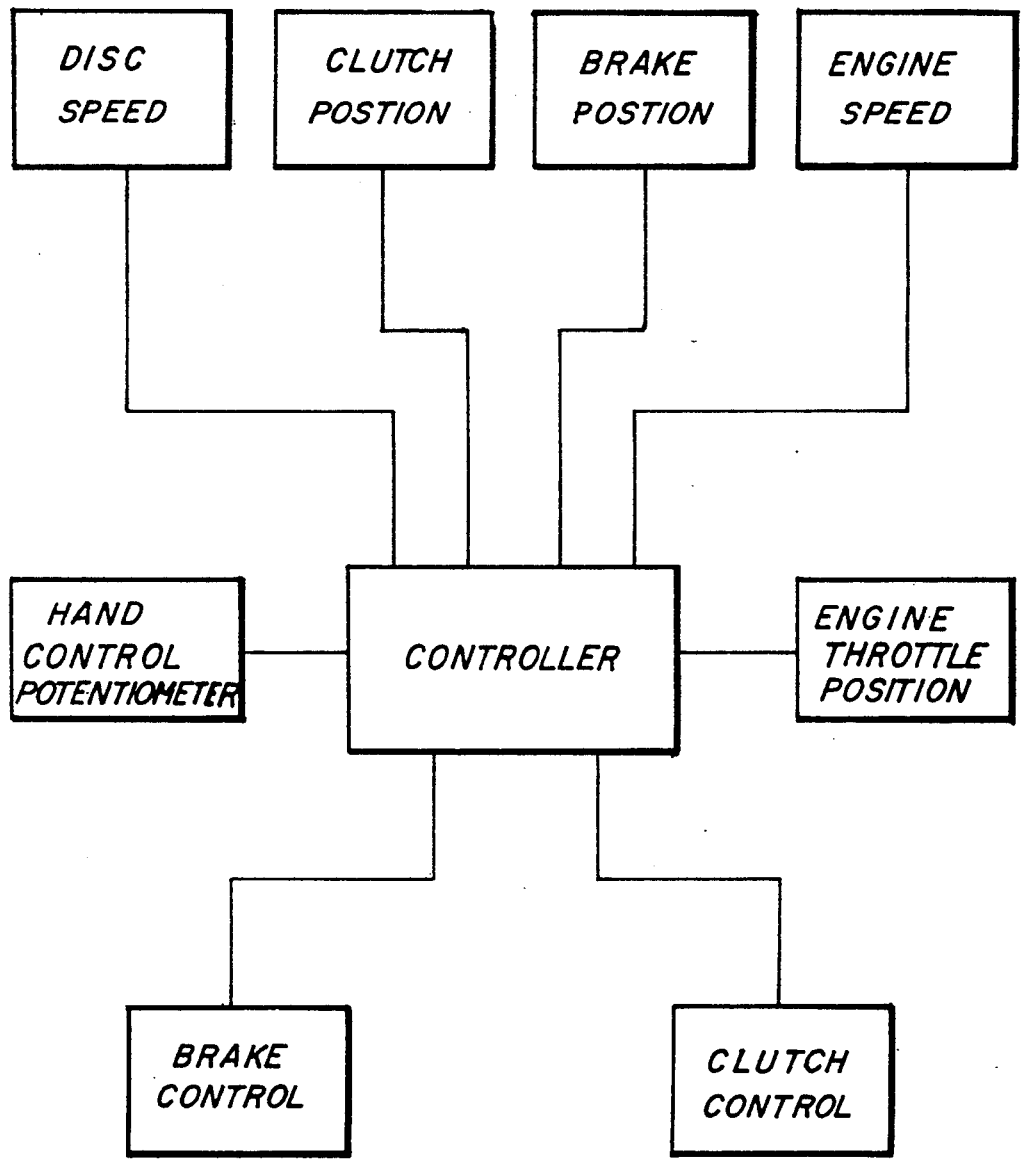
FIG. 17 is a block diagram of an electronic controller for balance, directional and safety control.

The control means may also be accomplished electronically using a solid state electronic controller shown schematically in FIG. 17. The device includes analog input from the governing devices including disc speed, clutch position, brake position, engine speed and throttle position. The analog output controls the brake and clutch. A hand control potentiometer allows the driver to react to obstacles and control speed and direction. Similar devices are marketed by Variable Resistive Components Institute of Evanston, Indiana.

FIG. 15 illustrates a safety control device having a spring biased impact switch allowing control of the vehicle to be overcome and the vehicle stopped in the event of hitting a solid object. This is accomplished by utilizing a pivotal weight 108 biased by two compression springs 110 and a set of contact points 112. If the vehicle is jarred abruptly, the weight 108 is moved opening the contact points 112 breaking the circuit to the power source 40. This device is basically unessential for operating the vehicle, however, it does provide a means of safety protection if desired.

In operation, the vehicle in the single flywheel 58 embodiment, the disc 20 is rotated by the power source 40 while in direct contact with the ground balancing on the shaft 48. When spinning freely the power is disengaged and the weight is shifted starting the vehicle to be propelled in the appropriate direction. The power is restored and the combination of weight and application of the brake 60 continue propulsion and provide steering.

In the two flywheel 62 embodiment, the stored kinetic energy of one rotating disc is utilized while the other is being brought up to speed by the power source 40. This method of propulsion allows continual energy to be used by switching from one flywheel to the other thereby employing stored energy from the flywheel effect and not directly driving from the power source eliminating the problem of the platform 26 spinning with the disc 20. Steering of this embodiment is the same as above, except it may be started immediately.

Figure 16:
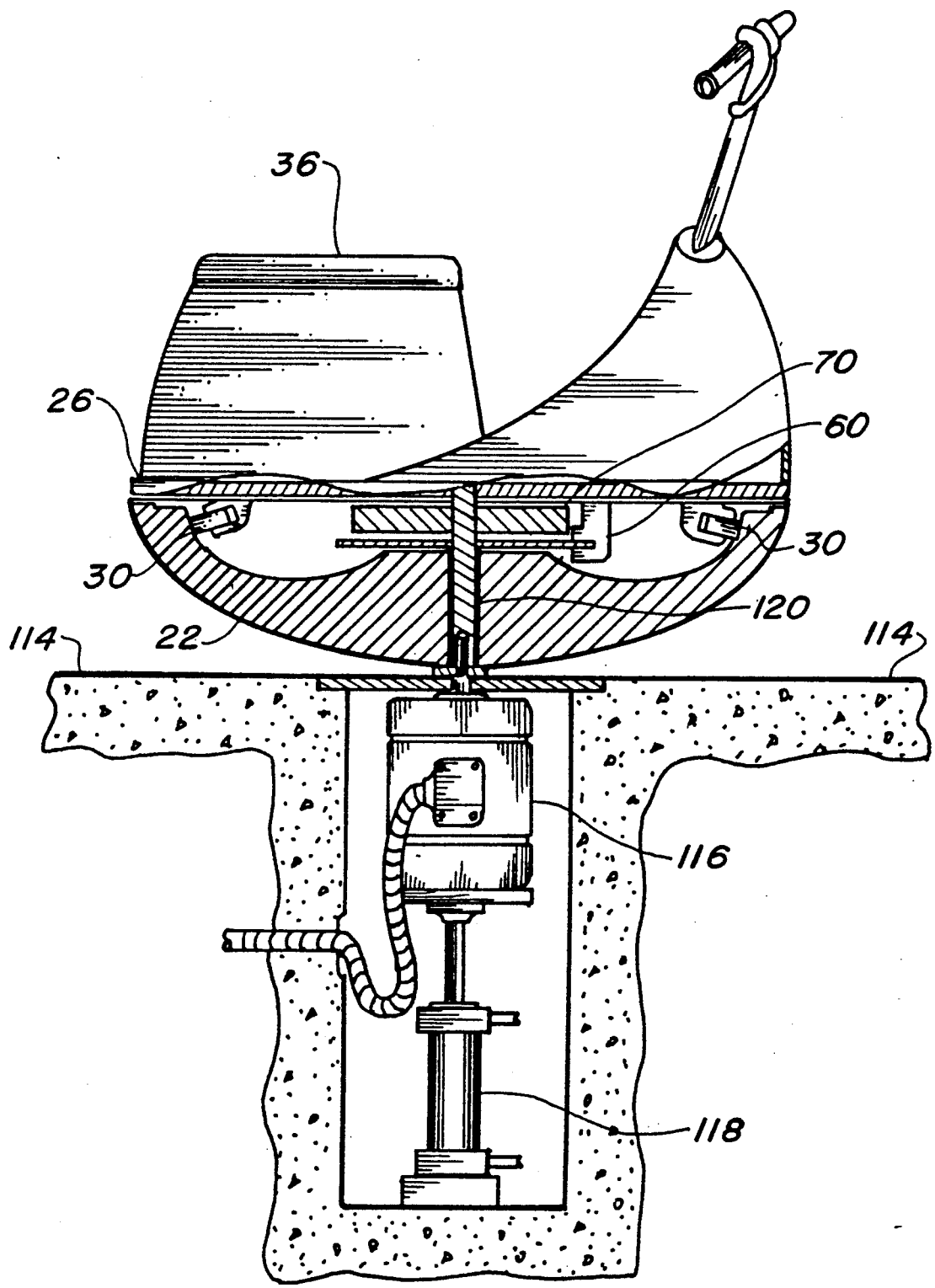
FIG. 16 is a cross-sectional view of an embodiment for an amusement park ride with a retractable motor for rotating the flywheel.

A final embodiment is illustrated in FIG. 16 and has utility as an amusement park ride where a fixed surface is available for propulsion thereon such as a smooth floor 114 and the power is furnished by a remote source. A stationary motor 116 either electric or internal combustion is retractably mounted under the floor with a hydraulic or pneumatic cylinder 118 or the like providing the linear force to retract the motor. A flywheel shaft 120 is fixably attached to the motor and contains a female spline which mates with the motor shaft. In operation, the motor 116 is forced upward into contact with the flywheel shaft 120 and is then rotated bringing the flywheel up to speed. The motor 116 is then dropped from engagement and the vehicle is then operated with the brake 60 in combination with the operators weight shifting as previously described.

While the invention has been described in complete detail and pictorially shown in the accompanying drawings, it is not to be limited to such details, since many changes and modifications may be made in the invention without departing from the spirit and the scope thereof. Hence, it is described to cover any and all modifications and forms which may come within the language and scope of the appended claims.

I claim:

1. A rotating disc propelled multi-surface omni-directional vehicle comprising:
   (a) a rotatable convex shaped disc with an outermost portion in contact with a surface upon which it is resting,
   (b) a platform capable of supporting weight pivotally connected to said disc;
   (c) a power source providing mechanical energy for spinning said disc;
   (d) transmission means to transfer mechanical energy in the form of torque from said power source to said disc enabling the disc to rotatably spin relative to the platform; said transmission means further comprise a belt connected to said power source, a flywheel driven from said belt, and a brake resistantly contiguous with said disc such that the flywheel rotates the disc when rotated by the belt and the brake impedes the rotation of the disc relative to the platform, and
   (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered.

2. The vehicle as recited in claim 1 wherein said rotatable convex shaped disc is elliptical in contour.

3. The vehicle as recited in claim 1 wherein said rotatable convex shaped disc is dish-shaped in contour.

4. The vehicle as recited in claim 1 further comprising a bearing rotatably separating said platform from said disc allowing minimal frictional resistance therebetween for rotation thereof.

5. The vehicle as recited in claim 1 further comprising a plurality of rollers attached to said platform and contiguously engaging said disc providing minimal frictional resistance therebetween for rotation thereof.

6. The vehicle as recited in claim 1 wherein said power source further comprises an internal combustion engine with accessories for self-contained operation.

7. The vehicle as recited in claim 1 wherein said power source further comprises an electric motor and a continuous supply of electrical power.

8. The vehicle as recited in claim 1 wherein said power source further comprises an air motor and means for storing compressed air on said vehicle.

9. The vehicle as recited in claim 1 wherein said power source is an internal combustion engine driven device.

10. The vehicle as recited in claim 9 wherein said transmission means further comprise a flexible rope connecting from said platform to said engine driven device allowing the disc to rotate on a contiguous surface with the control means providing the regulation to force the disc to spin and slide on the surface when the vehicle is towed.

11. The vehicle as recited in claim 1 wherein said power source further comprises a weight mass having sufficient inertial energy in the flywheels stored by movement of the disc relative to a supporting surface to rotate the disc spinning and slipping when the vehicle is positioned on an inclined surface.

12. The vehicle as recited in claim 11 further comprising a shaft with a bearing on the platform and a peripheral bearing on the circumference of the disc separating the disc from the platform allowing minimal frictional resistance therebetween, such that the weight mass will spin the disc freely when linearly moving on an inclined surface.

13. The vehicle as recited in claim wherein said control means further comprises a solid state electronic controller having analog inputs and analog outputs each interrelating with each other to maintain speed and directional control.

14. The vehicle as recited in claim 1 further comprising a safety control having a spring biased impact switch such that if the vehicle hits a solid object, the safety control automatically shuts off the engine.

15. The vehicle as recited in claim 1 wherein said power source further comprises a retractable motor having a splined shaft and said disc having a flywheel shaft with a female spline said motor shaft drivingly attached to said flywheel shaft allowing the flywheel to be rotated therewith the motor shaft subsequently retracted from communication with the vehicle permitting the disc to spin relative to the platform.

16. A rotating disc propelled multi-surface omni-directional vehicle comprising:
   (a) a rotatable convex shaped disc with an outermost portion in contact with a surface upon which it is resting;
   (b) a platform capable of supporting weight pivotally connected to said disc;
   (c) a power source disposed upon said platform providing mechanical energy for spinning said disc;
   (d) transmission means to transfer mechanical energy in the form of torque from said power source to said disc enabling the disc to rotatably spin relative to the platform, said transmission means further comprise a belt connected to said power source, a flywheel driven from said belt, and a brake resistantly contiguous with said disc such that the flywheel rotates the disc when rotated by the belt and the brake impedes the rotation of the disc relative to the platform; and,
   (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered the control means further comprise a weight, specifically positioned on the platform creating an off-center balance condition of said vehicle influencing the disc to be propelled in a given direction when spinning on a surface and the brake in combination with weight shift creating omni-directional control of the vehicle.

17. A rotating disc propelled multi-surface omni-directional vehicle comprising:
   (a) a rotatable convex shaped disc with an outermost portion in contact with a surface upon which it is resting;
   (b) a platform capable of supporting weight pivotally connected to said disc;
   (c) a power source disposed upon said platform providing mechanical energy for spinning said disc;
   (d) transmission means to transfer mechanical energy in the form of torque from said power source to said disc enabling the disc to rotatably spin relative to the platform, said transmission means further comprise a belt connected to said power source, a flywheel driven from said belt, and a brake resistantly contiguous with said disc such that the flywheel rotates the disc when rotated by the belt and the brake impedes the rotation of the disc relative to the platform; and, (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered the control means further comprise a weight, specifically positioned on the platform creating an off-center balance condition of said vehicle influencing the disc to be propelled in a given direction when spinning on a surface and the brake in combination with weight shift creating omni-directional control of the vehicle, the weight further comprises a human being driving the vehicle.

18. A rotating disc propelled multi-surface omni-directional vehicle comprising:

(a) a rotatable convex shaped disc with an outermost portion in contact with a surface upon which it is resting, (b) a platform capable of supporting weight pivotally connected to said disc;

(c) a power source disposed upon said platform providing mechanical energy for spinning said disc;

(d) transmission means to transfer mechanical energy in the form of torque from said power source to said disc enabling the disc to rotatably spin relative to the platform, said transmission means further comprise a first flywheel having an inner and an outer clutch means and a second flywheel having an inner and an outer clutch means, also a drive shaft having mating clutch means for both of the flywheels inner clutch means and a flywheel housing having mating clutch means for both flywheels outer clutch means, said drive shaft rigidly joined with the disc and said flywheel housing having rotational communication with said power source, both flywheels disposed within the housing independently rotatable such that energy is transmitted from the power source to the disc without direct contact by energizing the outer clutch on the first flywheel thereby placing the flywheel in communication with the power source through the flywheel housing developing a rotational force, further when sequentially disengaging the outer clutch means and engage the inner clutch means inertia stored within the flywheel is transmitted to the drive shaft and hence the disc, employing alternate engagement with the second flywheel thereby providing almost constant torque to the disc when repeatedly cycled, and, (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered.

19. A rotatable disc propelled multi-surface omni-directional vehicle comprising:

(a) a rotatable convex shaped disc with an outermost portion in contact with a surface upon which it is resting;

(b) a platform capable of supporting weight pivotally connected to said disc;

(c) a power source disposed upon said platform providing mechanical energy for spinning said disc;

(d) transmission means to transfer mechanical energy in the form of torque from said power source to said disc enabling the disc to rotatably spin relative to the platform, said transmission means further comprise a first flywheel having an inner and an outer clutch means and a second flywheel having an inner and an outer clutch means, also a drive shaft having mating clutch means for both of the flywheels inner clutch means and a flywheel housing having mating clutch means for both flywheels outer clutch means, said drive shaft rigidly joined with the disc and said flywheel housing having rotational communication with said power source, both flywheels disposed within the housing independently rotatable such that energy is transmitted from the power source to the disc without direct contact by energizing the outer clutch on the first flywheel thereby placing the flywheel in communication with the power source through the flywheel housing developing a rotational force, further when sequentially disengaging the outer clutch means and engage the inner clutch means inertia stored within the flywheel is transmitted to the drive shaft and hence the disc, employing alternate engagement with the second flywheel thereby providing almost constant torque to the disc when repeatedly cycled, said clutch means are actuated by a mechanical linkage, and (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered.

20. A rotatable disc propelled multi-surface omni-directional vehicle comprising:

(a) a rotatable convex shaped disc with an outermost portion in contact with a surface upon which it is resting;

(b) a platform capable of supporting weight pivotally connected to said disc;

(c) a power source disposed upon said platform providing mechanical energy for spinning said disc;

(d) transmission means to transfer mechanical energy in the form of torque from said power source to said disc enabling the disc to rotatably spin relative to the platform, said transmission means further comprise a first flywheel having an inner and an outer clutch means and a second flywheel having an inner and an outer clutch means, also a drive shaft having mating clutch means for both of the flywheels inner clutch means and a flywheel housing having mating clutch means for both flywheels outer clutch means, said drive shaft rigidly joined with the disc and said flywheel housing having rotational communication with said power source, both flywheels disposed within the housing independently rotatable such that energy is transmitted from the power source to the disc without direct contact by energizing the outer clutch on the first flywheel thereby placing the flywheel in communication with the power source through the flywheel housing developing a rotational force, further when sequentially disengaging the outer clutch means and engage the inner clutch means inertia stored within the flywheel is transmitted to the drive shaft and hence the disc, employing alternate engagement with the second flywheel thereby providing almost constant torque to the disc when repeatedly cycled, said clutch means are actuated by an electromagnetic solenoid means and, (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered.

21. A rotating disc propelled multi-surface omni-directional vehicle comprising:

(a) a rotatable convex shaped disc with an outermost portion in contact with a surface upon which it is resting;

(b) a platform capable of supporting weight pivotally connected to said disc;

(c) a power source disposed upon said platform providing mechanical energy for spinning said disc;

(d) transmission means to transfer mechanical energy in the form of torque from said power source to said disc enabling the disc to rotatably spin relative to the platform, said transmission means further comprise a first flywheel having an inner and an outer clutch means and a second flywheel having an inner and an outer clutch means, also a drive shaft having mating clutch means for both of the flywheels inner clutch means and a flywheel housing having mating clutch means for both flywheels outer clutch means, said drive shaft rigidly joined with the disc and said flywheel housing having rotational communication with said power source, both flywheels disposed within the housing independently rotatable such that energy is transmitted from the power source to the disc without direct contact by energizing the outer clutch on the first flywheel thereby placing the flywheel in communication with the power source through the flywheel housing developing a rotational force, further when sequentially disengaging the outer clutch means and engage the inner clutch means inertia stored within the flywheel is transmitted to the drive shaft and hence the disc, employing alternate engagement with the second flywheel thereby providing almost constant torque to the disc when repeatedly cycled, said clutch means are actuated by a hydraulic system having a hydraulic cylinder and mechanical linkage, and (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered.

22. A rotating disc propelled multi-surface omni-directional vehicle comprising:

(a) a rotatable convex shaped disc with an outermost portion in contact with a surface upon which it is resting;

(b) a platform capable of supporting weight pivotally connected to said disc;

(c) a power source disposed upon said platform providing mechanical energy for spinning said disc;

(d) transmission means to transfer mechanical energy in the form of torque from said power source to said disc enabling the disc to rotatably spin relative to the platform, said transmission means further comprise a first flywheel having an inner and an outer clutch means and a second flywheel having an inner and an outer clutch means, also a drive shaft having mating clutch means for both of the flywheels inner clutch means and a flywheel housing having mating clutch means for both flywheels outer clutch means, said drive shaft rigidly joined with the disc and said flywheel housing having rotational communication with said power source, both flywheels disposed within the housing independently rotatable such that energy is transmitted from the power source to the disc without direct contact by energizing the outer clutch on the first flywheel thereby placing the flywheel in communication with the power source through the flywheel housing developing a rotational force, further when sequentially disengaging the outer clutch means and engage the inner clutch means inertia stored within the flywheel is transmitted to the drive shaft and hence the disc, employing alternate engagement with the second flywheel thereby providing almost constant torque to the disc when repeatedly cycled, said clutch means are actuated by a pneumatic system pneumatic solenoid and mechanical linkage, and (e) control means producing regulation of the disc rotational speed, and angular disposition of the platform relative to the surface upon which the vehicle is residing, thus enabling omni-directional steering and speed governance as the disc spins on the surface combining resistance, radial shape and torque allowing the vehicle to be propelled and steered.

* * * * *

UNITED STATES PATENT AND TRADEMARK OFFICE
CERTIFICATE OF CORRECTION

PATENT NO. : 5,025,876

DATED : June 25, 1991

INVENTOR(S) : George B. Barnard

It is certified that error appears in the above—identified patent and that said Letters Patent is hereby corrected as shown below:

Column 10, line 4; after "claim" insert --1--.

Signed and Sealed this

Twenty-fourth Day of November, 1992

Attest:

DOUGLAS B. COMER

Attesting Officer     Acting Commissioner of Patents and Trademarks